United States Patent

[11] 3,588,728

| [72] | Inventor | Shmuel Elazar<br>Camarillo, Calif. |
|---|---|---|
| [21] | Appl. No. | 759,434 |
| [22] | Filed | Sept. 12, 1968 |
| [45] | Patented | June 28, 1971 |
| [73] | Assignee | Bell & Howell Company<br>Chicago, Ill. |

[54] IMPEDANCE BRIDGE TRANSDUCER CIRCUITS
3 Claims, 2 Drawing Figs.

[52] U.S. Cl.................................................... 330/69,
330/146
[51] Int. Cl...................................................... H03f 1/02,
H03f 5/00
[50] Field of Search............................................330/69, 146

[56] References Cited
UNITED STATES PATENTS
2,615,999  10/1952  Culicetto..................... 330/146X
3,414,834  12/1968  Stubbs........................... 330/69

Primary Examiner—Nathan Kaufman
Attorney—Jackson and Jones

ABSTRACT: A bridge-type transducer and amplifier circuit for providing a high level output signal is energized from a common source of excitation voltage. A differential amplifier is connected to the bridge for producing an output signal between an output terminal thereof and a reference terminal maintained at a predetermined reference voltage level. Means connected across the source of excitation voltage and to a reference terminals maintains the reference terminal at said voltage level, and can include a Zener diode or an emitter follower to provide a low output impedance for the reference terminal.

INVENTOR.
SHMUEL ELAZAR
BY JACKSON & JONES
Attorneys

IMPEDANCE BRIDGE TRANSDUCER CIRCUITS

BACKGROUND OF THE INVENTION

1. Field of the Invention

This invention relates to transducer circuits and more particularly to the combination of an impedance bridge and a high gain differential amplifier.

2. Description of the Prior Art

Transducers are useful in many systems wherein it is desired to monitor conditions at certain points therein. It is the general practice to place a transducer arrangement, which is sensitive to changes in the conditions being measured, in proximity to the object or point being monitored. Where transducers of the impedance bridge type, e.g. Wheatsone resistance bridges, are employed, changes in the conditions being monitored produce changes in the bridge impedances which accordingly produce changes in the transducer output voltage. Such transducers normally produce low level output voltages, i.e. 50 to 120 milivolts at full scale. Such low voltages are oftentimes difficult to accurately correlate with changes in the monitored conditions, and as such, high level output signals, e.g. several volts, are generally desirable in most applications and particularly in telemetering systems.

Impedance bridge transducers may be used in combination with differential amplifiers to provide high level output signals. One such circuit is shown in U.S. Pat. No. 3,148,339 issued to Norton W. Bell, et al. Operational amplifiers for amplifying difference signals produce an output voltage that is normally defined as the difference in the potential at the amplifier output terminal and the potential at the center tap of the amplifier power supply. For this reason, two separate voltage sources are used as a general rule to energize differential amplifiers and to provide the center tap reference.

In the past a combined bridge and differential amplifier circuit has required the use of at least one power supply in addition to the excitation voltage source for the bridge to provide the necessary excitation and the center tap reference.

The present invention overcomes the disadvantages of such prior art systems by providing a transducer bridge and differential amplifier which utilize a single common source of excitation voltage.

SUMMARY OF THE INVENTION

In accordance with the present invention, a differential amplifier is connected to an impedance bridge for amplifying the bridge output. A single source of excitation voltage is connected to the bridge and the amplifier. The amplifier includes an output terminal and is arranged to produce an output signal between the output terminal and a voltage level which is a predetermined portion of the excitation voltage. Voltage referencing means is connected across the source of excitation voltage and to a reference terminal, for maintaining the reference terminal at said voltage level so that the amplifier output voltage appears between the output and reference terminals. An emitter follower or Zener diode circuit may be included in the voltage referencing means to establish a low output impedance for the reference terminal.

DESCRIPTION OF ONE PREFERRED EMBODIMENT

Figure 1:
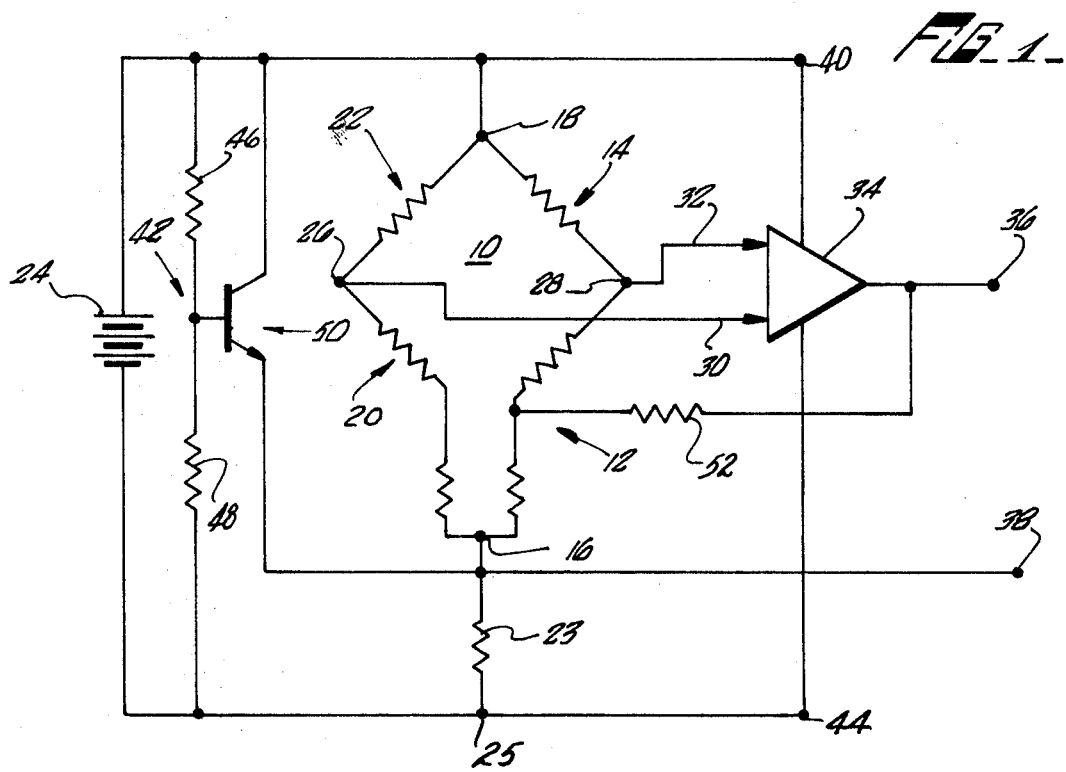
FIG. 1 is a schematic diagram of one embodiment of this invention.

Referring now to the drawings, there is shown in FIG. 1 one embodiment of the transducer system of the present invention which includes an impedance bridge network 10. As illustrated the bridge network 10 includes branches 12 and 14 connected in series between terminals 16 and 18. The bridge 10 also includes branches 20 and 22 connected in series between the terminals 16 and 18. The bridge 10 is normally balanced in that the impedance ratio of branches 12 and 14 normally is equal to the impedance ratio of the branches 20 and 22. A resistor 23 is connected between the terminal 16 and a terminal 25. A source of excitation voltage 24 is connected across the terminals 18 and 25 to supply power to the bridge. The source 24 may be a battery providing a voltage of 10 volts, for example.

The opposite branches of the bridge 10 are variable in like sense while the adjacent branches are variable in an opposite sense. Thus when the condition being monitored by the transducer varies, the variable bridge elements in the branches 14 and 20 vary in the same sense while the variable bridge elements in the bridge arms 12 and 22 vary in the same sense but oppositely with respect to the branches 14 and 20. In this manner a given variation in the condition being monitored produces a maximum variation in the impedance of the transducer arrangement which causes a substantial unbalancing of the bridge 10.

An unbalance of bridge 10 results in a voltage being developed between output terminals 26 and 28, which terminals are connected to a pair of input leads 30 and 32 of a differential amplifier 34, as illustrated. The amplifier 34, in turn, produces an output signal between an output terminal 36 and a reference terminal 38 which is maintained at a predetermined voltage level. The amplifier 34 includes a pair of excitation terminals 40 and 44 which are respectively connected across the voltage source 24 as shown.

Voltage referencing means 42 is connected to the battery 24 and to the reference terminal 38 to maintain the reference terminal 38 at the reference voltage level so that the amplifier output voltage appears between the terminals 36 and 38. The voltage referencing means 42 includes a pair of voltage divider resistors 46 and 48, a transistor 50 and the resistor 23. The resistors 46 and 48 are connected in series across the battery 24. The bridge terminal 16 is connected to the emitter of the transistor as shown.

The values of the resistors 46 and 48 are chosen to set the base of the transistor 50 at the desired reference level. For example, the base of the transistor may be set at 2.5 volts above the negative terminal of the battery 24.

The transistor 50 is connected in an emitter follower configuration across the voltage source to clamp the voltage at the terminal 16 to the reference level for a large current range, thereby providing a low output impedance for the reference terminal. It should be noted that it is not necessary to connect the emitter of the transistor 50 to the terminal 16. If desired the reference terminal 38 may be connected directly to the emitter of the transistor without being coupled to the terminal 16.

The amplifier 34 may be provided with a negative feedback resistor 52 to increase the linearity of the system if desired. The use of such a feedback resistor in a combined bridge differential amplifier system is described in detail in U.S. Pat. No. 3,148,339.

Figure 2:
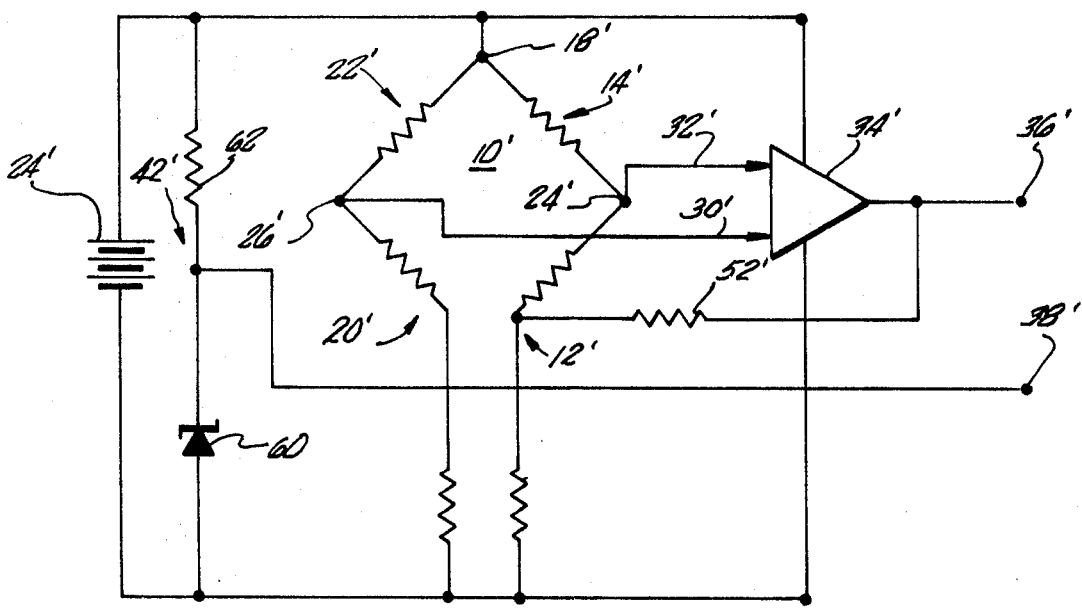
FIG. 2 is a schematic diagram of another embodiment of this invention.

FIG. 2 (wherein primed reference numerals are used to indicate corresponding components shown in FIG. 1) illustrates another embodiment of the present invention where the voltage referencing means 42' comprises a Zener diode 60 connected in series with a resistor 62 across the source 24'. The reference terminal 38' is connected to the cathode of the Zener diode 60. In this embodiment the resistor 23 (FIG. 1) is eliminated and the full voltage from the source 24' is applied across the bridge 10'. The Zener diode 60 is chosen to have a suitable breakdown voltage to provide the desired reference level. For example, the reference terminal is maintained at 2.5 volts above the negative battery terminal with the use of a Zener diode having a 2.5 volt breakdown voltage.

A transducer-amplifier circuit constructed in accordance with the present invention has produced an output voltage swing between 0 and 5 volts in response to the full range of bridge unbalance.

There has been described a transducer circuit including a differential amplifier and a bridge network which are energized from a common source of excitation voltage. Various modifications of the described embodiments will be apparent to those skilled in the art without involving a departure from the spirit of the invention.

I claim:

1. A transducer system for providing high level voltage output signals representing changes in conditions being monitored, said system comprising:

a resistance bridge circuit having a pair of input terminals and a pair of output terminals for providing a bridge signal at said output terminals representing bridge imbalances produced by changes in conditions being monitored;

a direct current voltage source, operatively coupled to said pair of input terminals of said resistance bridge circuit, said source having an upper voltage level and a lower voltage level;

a reference output lead;

voltage referencing means, coupled in parallel with said direct current voltage source and coupled to said reference output lead, for maintaining said reference output lead at a predetermined voltage level intermediate said upper voltage level and said lower voltage level of said direct current voltage source; and a differential amplifier having a single amplifier output terminal and a pair of amplifier input terminals respectively coupled to the output terminals of said resistance bridge circuit, said amplifier serving to amplify said bridge signals, said high level voltage output signal being developed between said amplifier output terminal and said reference output lead.

2. The apparatus defined by claim 1 wherein the voltage referencing means includes:

first and second resistors connected in series across said direct current voltage source;

a third resistor connected between said reference output lead and said direct current voltage source; and a transistor having an emitter, a collector, and a base, the base of the transistor being connected to the junction of the first and second resistors, the emitter and collector of the transistor and the third resistor being connected in series across the direct current voltage source.

3. The apparatus defined by claim 1 wherein the voltage referencing means comprises a Zener diode and a resistor connected in series across the direct current voltage source, the reference output lead being connected to the junction of the resistor and Zener diode, said Zener diode operating to maintain said reference output lead at said predetermined voltage level.